No. 887,940. PATENTED MAY 19, 1908.
L. HÖHNKE.
PORTABLE FIELD KITCHEN.
APPLICATION FILED DEC. 4, 1906.

2 SHEETS—SHEET 1.

WITNESSES:

INVENTOR,
LOUIS HÖHNKE,
BY
Attorney.

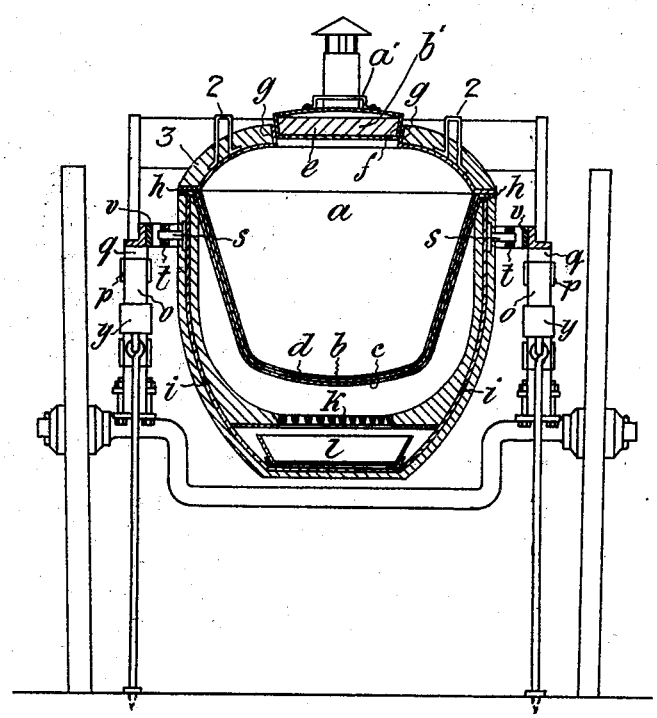

UNITED STATES PATENT OFFICE.

LOUIS HÖHNKE, OF BROMBERG, GERMANY.

PORTABLE FIELD-KITCHEN.

No. 887,940.  Specification of Letters Patent.  Patented May 19, 1908.

Application filed December 4, 1906. Serial No. 346,220.

*To all whom it may concern:*

Be it known that I, LOUIS HÖHNKE, a subject of the King of Prussia, residing at 6$^a$ Elisabethmarkt, Bromberg, in the Kingdom of Prussia and Empire of Germany, have invented new and useful Improvements in Portable Field-Kitchens, of which the following is a specification.

This invention relates to portable field kitchens.

Kitchen carriages on which the cooking takes place during the drive, have the drawback that on account of the vibrations to which the cooking vessel is subjected during the drive the food rapidly becomes sour and that, when driving at the usual speed, it is impossible to open the cover of the cooking vessel, such as is requisite for watching the progress of the cooking, because the food would be thrown out. According to the aforesaid invention these drawings are obviated by suspending the cooking vessel, or the fire pot designed for the reception of the same, by means of trunnions in a horizontal ring adapted to turn about its diameter perpendicular to the axis of the trunnion of the cooking vessel. Owing to this so-called cardanic suspension the cooking vessel retains its vertical position in every position of the carriage during the drive. The rocking movements of the carriage during the drive are considerably reduced in their transmission to the cooking vessel.

Figure 1:
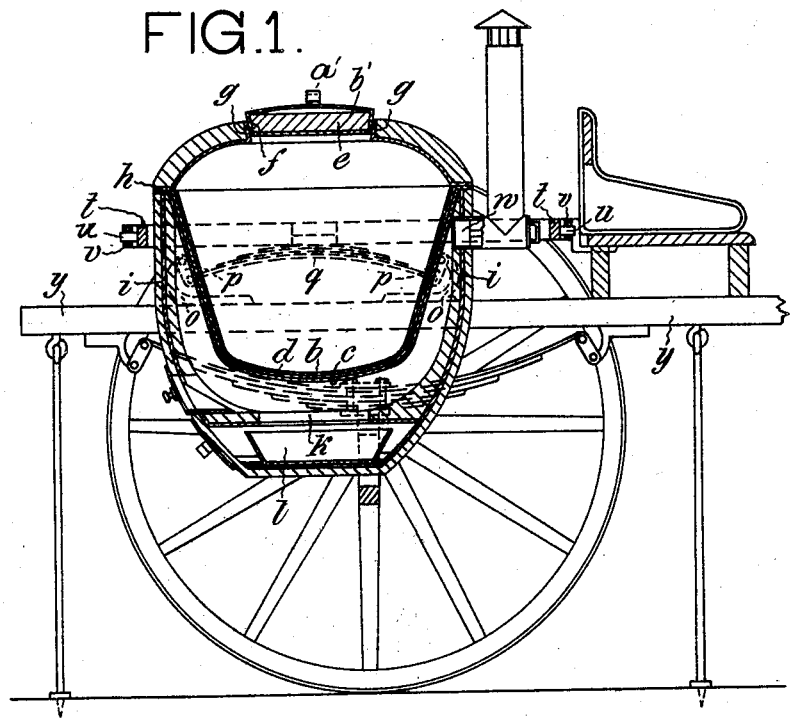
Figure 2:
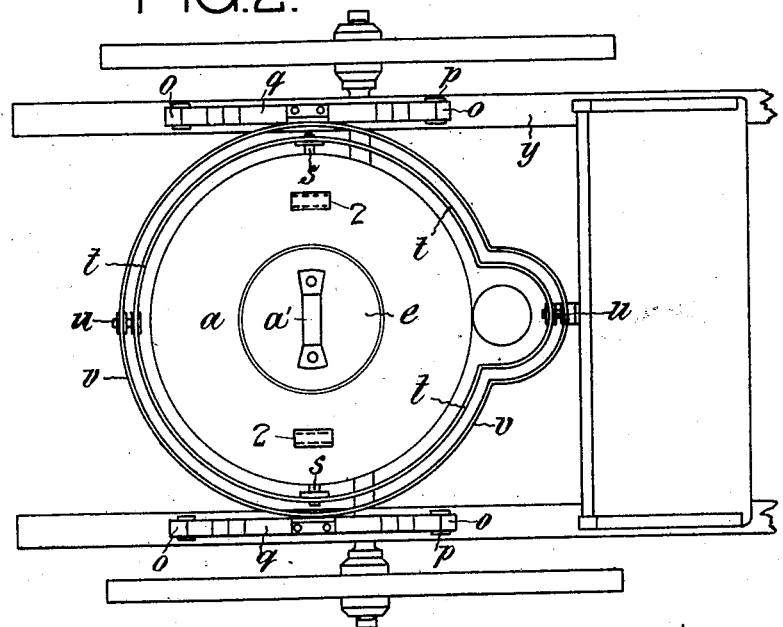

In the accompanying drawing Figure 1 is a vertical longitudinal section through the carriage and cooking vessel; Fig. 2 is a plan and Fig. 3 a transverse section.

The lower part of the cooking vessel $a$, which is exposed to the fire, has a double wall $b$ $c$ with an intermediate layer $d$ of asbestos, designed to surely prevent the burning of the food placed in the vessel, without requiring to be continually replaced such as the water baths heretofore used. The discharge opening has an interiorly taper neck $g$, with which engages the corresponding taper edge $f$ of the cover $e$ provided with a handle $a^1$. By this means the vessel will always be kept tightly closed and the food prevented from spurting out.

For the cooking vessel $a$ to be placed upon the fire pot $i$, it is provided all around with a flange $h$ adapted to bear upon the upper edge of the said fire pot, which is lined with fire clay or other refractory insulating material and furnished with a grate $k$ and an ash-pan $l$. Ears 2 on the cooking vessel serve for lifting this vessel from the fire pot and for taking hold of the same during the transport.

The fire pot has trunnions $s$ by which it is held in a horizontal ring $t$. This ring is provided with trunnions $u$, the axis of which is perpendicular to that of the trunnions $s$, and which are held in a second ring $v$. The latter is supported by springs $q$ fixed through the intervention of links $p$ to blocks $o$ on the longitudinal beams $y$ of the carriage frame. In this manner the spring-supported ring $v$ has a certain amount of play enabling it to withstand shocks.

If heretofore the food was to be kept warm for a time or, as may happen in the field, for hours it had to be placed in special warming vessels as the warming over a fire gives rise to the deterioration of the flavor of the food. With a view to rendering these special warming vessels superfluous, all such walls of the cooking vessel and of the fire pot as are exposed to the atmospheric air are coated with a dry loose insulating material, (as is also the cover at $b'$) so that after closing the fire doors and obstructing the flue, which parts are likewise coated with the insulating material, a warming vessel is obtained wherein food will without alteration keep warm for twelve hours and longer in the severest frost.

The fire pot $i$, its fire and ash door and the damper, as well as the part of the cooking vessel $a$ protruding from the fire pot and its cover $e$, are coated with a layer of insulating material. It is expedient to make these parts of the walls double, the dry loose insulating material being arranged between the double walls.

After closing the fire doors of the cooking vessel $a$ and inserting the stopper $w$ into the elbow of the chimney the food contained in the cooking vessel is completely withdrawn from the action of the atmospheric air.

If the atmospheric air is shut off when the food is only just beginning to boil the food will get completely cooked afterwards and keep warm just as long. Thus a great saving of fuel is achieved and the boiling time reduced.

What I claim as my invention, and desire to secure by Letters Patent is—

1. In a device of the character described, a cooking vessel, a fire pot arranged to receive the same, trunnions provided on the pot, a horizontal ring for holding said trunnions, trunnions provided on said ring at right angles to those first-named, and an outer frame for holding said second-mentioned trunnions, substantially as herein set forth.

2. In a device of the character described, a cooking vessel, part of which has double walls and an intermediate layer of asbestos provided therein, a fire pot arranged to receive the cooking vessel, trunnions provided on the pot, a horizontal ring for holding the trunnions of the fire pot and adapted to be turned about its diameter at right angles to the axes of the said trunnions, substantially as herein set forth.

3. In a device of the character described, a cooking vessel, a fire pot arranged to receive the same, trunnions provided on the pot, a horizontal ring for holding the trunnions of the fire pot, trunnions furnished on this ring and having their axes at right angles to the aforesaid trunnions, a second ring for holding the trunnions of the said horizontal ring, a carriage frame, and means attached to this frame for the elastic support of the aforesaid second ring, substantially as herein set forth.

4. In a device of the character described, a cooking vessel, a fire pot arranged to receive the same, trunnions provided on the pot, a horizontal ring for holding the trunnions of the fire pot, trunnions furnished on this ring and having their axes at right angles to the aforesaid trunnions, a second ring for holding the trunnions of the said horizontal ring, a carriage frame, blocks arranged on this frame, links pivoted to the said blocks, and springs attached to these links and to the aforesaid second ring, substantially as herein set forth.

5. In a device of the character described, a cooking vessel, part of which has double walls and an intermediate layer of asbestos provided therein, and part of which is coated with a dry loose insulating material, a fire pot partly coated with such insulating material, trunnions provided on the pot, a horizontal ring for holding the trunnions of the fire pot, trunnions furnished on this ring and having their axes at right angles to the aforesaid trunnions, a second ring for holding the trunnions of the horizontal ring, a carriage frame, and means for the elastic support of the aforesaid second ring, substantially as herein set forth.

In testimony whereof I have signed my name to this specification in the presence of two subscribing witnesses.

LOUIS HÖHNKE.

Witnesses:
    OTTO KUNST,
    CARL GROPPE.